2,560,486

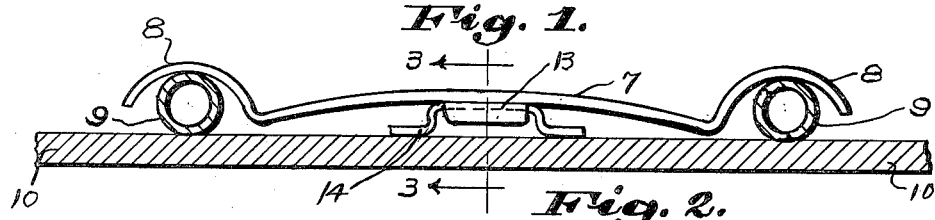
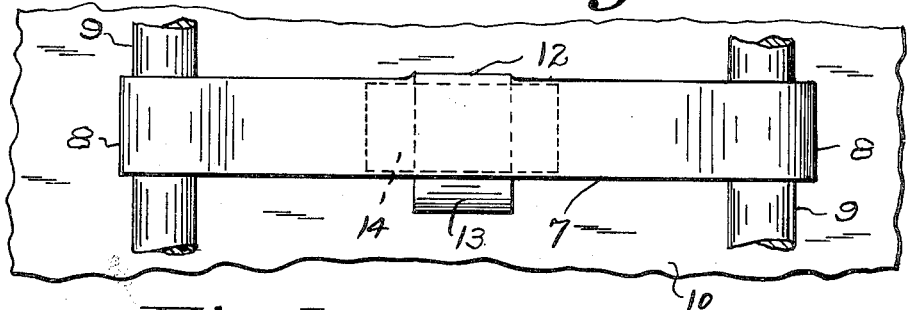
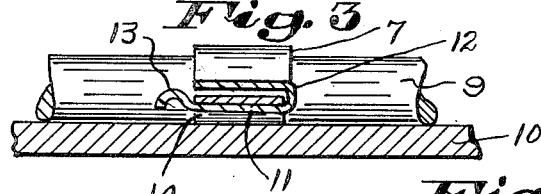
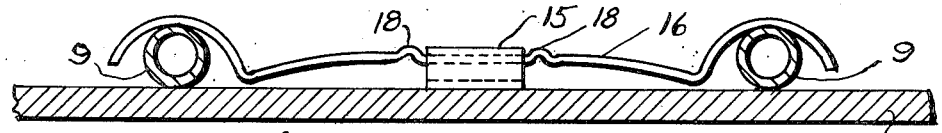
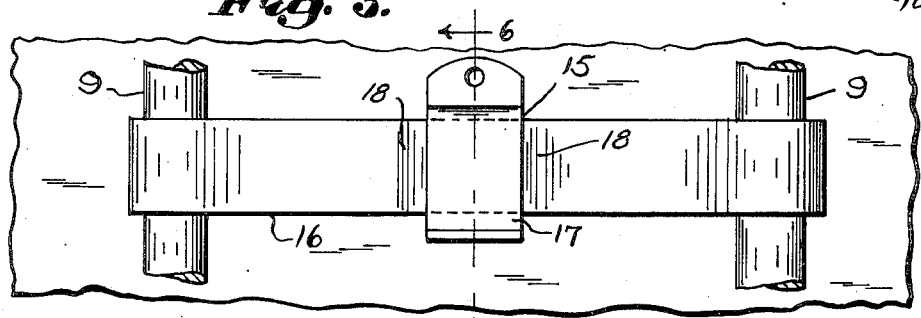
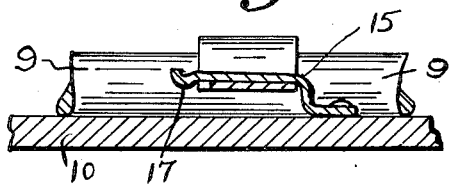
Inventor
Stuart T. Shears.
By Walter S. Jones
Attorney Patented July 10, 1951

UNITED STATES PATENT OFFICE 2,560,486

SPRING FASTENING DEVICE

Stuart T. Shears, Arlington, Mass., assignor to United-Carr Fastener Corporation, Cambridge, Mass., a corporation of Massachusetts Application July 20, 1945, Serial No. 606,261

2 Claims. (Cl. 248—68)

The present invention relates to fastening devices for cylindrical articles, such as pipes, wires and the like, and aims generally to improve and simplify existing fastening devices of that type.

More particularly, the invention relates to the improvement of fastening devices for pipes, wire and the like by the provision of a relatively flat transverse spring having its ends in engagement with the articles to be secured, and having a quick operating securing means to the support intermediate the articles, the entire assembly being held against loosening principally by the pressure on the securing means by the transverse spring which is biased away from the support at its midpoint.

Other aims and objects of the invention will be apparent to those skilled in the art from a consideration of the accompanying drawings and annexed specification illustrating and describing two embodiments of the invention.

In the drawings:

Fig. 1 is a side elevation of an installation embodying one form of my improved device;

Fig. 2 is a top plan view thereof;

Fig. 3 is an enlarged transverse sectional view thereof taken on the line 3—3 of Fig. 1;

Fig. 4 is a side elevation of an installation embodying a second form of my improved device;

Fig. 5 is a top plan view of the installation shown in Fig. 4; and

Fig. 6 is an enlarged transverse sectional view thereof taken on the line 6—6 of Fig. 4.

Referring to the drawings, my improved fastening device comprises a resilient member 7 preferably formed of flat spring steel of proper width and thickness to possess the necessary strength for the purpose hereinafter described. The extremities 8 of the member 7 are formed with a transverse bend approximating a portion of a cylindrical surface in order to firmly engage the pipes 9 or like cylindrical articles, and clamp them firmly against the face of the base of a support 10. It is obvious that the contour of the extremities 8 may be modified to adapt my fastening device to the contour of the articles being secured thereby.

In the form of my invention shown in Figs. 1, 2 and 3, a tongue 11 is formed at the midportion 12 of the member 7 disposed parallel to and transversely of the member 7. The tongue 11 is preferably formed unitary with the member 7 by bending a projecting tab thereof under the midportion 12 thereof and in such a manner that the tongue is parallel to and spaced from the underside of the member as shown in Fig. 3. The tongue may be formed of spring steel and preferably has a transverse stop or raised portion 13 adjacent the end thereof.

The fastening device is adapted to be attached to a support positioned between the tongue 11 and midportion 12 of the member 7 and such support may be a thin sheet metal member such as a U-shaped bridge member 14, formed from or attached to the base 10 and of suitable size to be engaged by the tongue 11 as shown in Fig. 3. The support or member 14 need not be formed of resilient material, but is preferably of proper size to maintain the fastening device in predetermined position.

The midportion 12 of the member 7 is so shaped that when in released position and with the extremities 8 thereof engaging the pipes 9, the tongue 11 and midportion 12 must be depressed towards the base 10 in order to enter the tongue 11 into the bridge member 14. After engaging the tongue 11 into the bridge member 14, the pressure necessary to depress the midportion 12 may be released and the inherent tendency of the resilient member 7 to resume its former shape will cause the tongue 11 to firmly engage the underside of the bridge member 14, thus retaining the member 7 into position relative to the base 10 and also firmly pressing the pipes 9 against the base 10 and retaining the pipes in fixed position. The pressure necessary to engage my fastening device may be controlled by the design of the resilient member 7, but is preferably such that the member 7 may be manually engaged without the use of tools. The raised portion 13 formed on the tongue 11 further aids in rigidly securing the member 7 against accidental displacement by resisting withdrawal of the tongue from the bridge member 14.

In the form of my invention shown in Figs. 4, 5 and 6, the support comprises a base 10 and a tongue 15 formed from or firmly attached to the base, the tongue preferably being positioned parallel to the direction of and between the articles 9 to be secured. The tongue 15 is preferably made of spring steel but will function, though of rigid material. The portion of the tongue adapted to engage the resilient transverse member 16 of the fastener is spaced from the support, and a transverse raised portion 17 of the tongue 15 is provided to assure against accidental displacement of the member 16.

The resilient transverse member 16 is in general similar to the member 7 of Figs. 1, 2 and 3. Its article-engaging extremities are the same, and its general contour and function are the same. However, in lieu of the transverse tongue 11 of the member 7, a tongue 15 is provided on the support. The transverse raised portions 18 are provided near the midportion of the member 16 and are spaced apart to provide a depression for receiving the tongue 15 therebetween to maintain the tongue 15 near the midportion of the member 16.

To apply this form of my fastening device, it is necessary as in the previously described modification to engage the extremities thereof with the articles 9. Then the midportion of the member 16 is depressed and slipped into position under the tongue 15, after which the pressure may be released and the device will remain in position. The method of functioning of my device as described in this modification is substantially similar to that previously described, the essential difference being that the tongue is attached to the resilient transverse member in the first form of my invention and to the support in the second form thereof.

The improved fastening device of my invention is adaptable to many installations. Its chief value lies in providing a means for readily and detachably securing spaced articles of relatively light weight to a support and is of value in securing condenser tubes and other tubing of a mechanical refrigerator. Also, it is of particular value in securing other tubing or like articles to a support when such tubing must be removed from time to time for cleaning and for maintenance. It is obvious that the fastening device herein described is quickly and more readily attached and detached than screw fastenings of various types now used. Also, my invention is equally applicable to the securing of wires to a support in a like manner.

It is feasible to apply the form of my invention first described directly over an edge of a relatively thin support and thus eliminate the bridge member 14. In such an application the tongue 11 would be positioned on the reverse side of the support instead of the pipes 9.

Although I have illustrated and described two preferred forms of my invention, I do not wish to be limited thereby because the scope of my invention is best defined by the following claims.

I claim:

1. A fastener for holding spaced elongated articles against a support, said fastener comprising an elongated resilient strip having article-engaging portions at its extremities and two spaced transverse ridges at its midportion, and a tongue projecting from and parallel to said support, said tongue adapted to lie between said ridges and engage said strip and having a raised portion at the free end thereof, the midportion of said strip being biased towards said tongue.

2. The combination of a support, spaced elongated articles to be supported thereby, a resilient elongated strip having extremities engaging said articles and a midportion biased away from said support, a cooperating fastener strip secured to said support and disposed in a plane substantially parallel to and adjacent the article supporting face of said support, and means integral with said mid-portion including a coacting surface for tensioned engagement with the face of said cooperating fastener strip adjacent said support for securing said elongated strip to said support.

STUART T. SHEARS.

REFERENCES CITED

The following references are of record in the file of this patent:

UNITED STATES PATENTS

| Number | Name | Date |
|---|---|---|
| 1,307,240 | Christopher | June 17, 1919 |
| 1,543,253 | Gerwig | June 23, 1925 |
| 1,772,687 | Reinke | Aug. 12, 1930 |
| 1,981,973 | Tinnerman | Nov. 27, 1934 |
| 2,109,213 | Fearing | Feb. 22, 1938 |
| 2,266,266 | Ritter | Dec. 16, 1941 |
| 2,278,691 | Cotter | Apr. 7, 1942 |
| 2,334,705 | Hotson | Nov. 23, 1943 |